US008863388B2

(12) United States Patent
Aschoff et al.

(10) Patent No.: US 8,863,388 B2
(45) Date of Patent: Oct. 21, 2014

(54) STACKED ADHESIVE LINES

(75) Inventors: Chris Aschoff, Corvallis, OR (US); Anthony J. Galvan, Corvallis, OR (US); Henry Kang, Corvallis, OR (US); Kelly B. Smith, Corvallis, OR (US); Lawrence Thurber, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 13/052,401

(22) Filed: Mar. 21, 2011

(65) Prior Publication Data

US 2012/0242757 A1 Sep. 27, 2012

(51) Int. Cl.

| | |
|---|---|
| ***B21D 53/76*** | (2006.01) |
| ***B23P 17/00*** | (2006.01) |
| ***B41J 2/16*** | (2006.01) |

(52) U.S. Cl.

CPC . *B41J 2/16* (2013.01); *B41J 2/1623* (2013.01)

USPC .......................................................... 29/890.1

(58) Field of Classification Search

None

See application file for complete search history.

(56) References Cited

U.S. PATENT DOCUMENTS

| | | | | |
|---|---|---|---|---|
| 5,221,397 | A * | 6/1993 | Nystrom | 156/273.5 |
| 6,339,881 | B1 * | 1/2002 | Fisher et al. | 29/890.1 |
| 6,409,307 | B1 * | 6/2002 | Akhavain et al. | 347/42 |
| 7,404,613 | B2 | 7/2008 | Kwan et al. | |
| 2003/0047354 | A1 * | 3/2003 | Havas et al. | 174/260 |
| 2006/0269713 | A1 * | 11/2006 | Zuege et al. | 428/40.1 |
| 2009/0068790 | A1 * | 3/2009 | Caskey et al. | 438/109 |
| 2009/0095825 | A1 | 4/2009 | Ahmadi et al. | |
| 2010/0076119 | A1 | 3/2010 | Ishizawa et al. | |

OTHER PUBLICATIONS

Brad Perkins, et al.; "Designing Printed Circuit Boards for Efficient Pop Underfill"; May 1, 2010; http://www.emasiamag.com/article-7214-designingprintedcircuitboardsforefficientpopunderfiII-Asia.html.

* cited by examiner

*Primary Examiner* — Matthew Luu
*Assistant Examiner* — Erica Lin

(57) ABSTRACT

A method for adhesive stacking includes dispensing a first line of adhesive onto a first substrate; dispensing at least one additional line of adhesive stacked onto the first line of adhesive; and placing a second substrate onto the at least one additional line of adhesive to join the first and second substrates.

19 Claims, 6 Drawing Sheets

STACKED ADHESIVE LINES

BACKGROUND

Many devices, both electronic and otherwise, are made up of small components that are connected or held in place using some form of adhesive. Specially designed equipment is often needed to apply small amounts of precisely placed adhesive to such parts.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
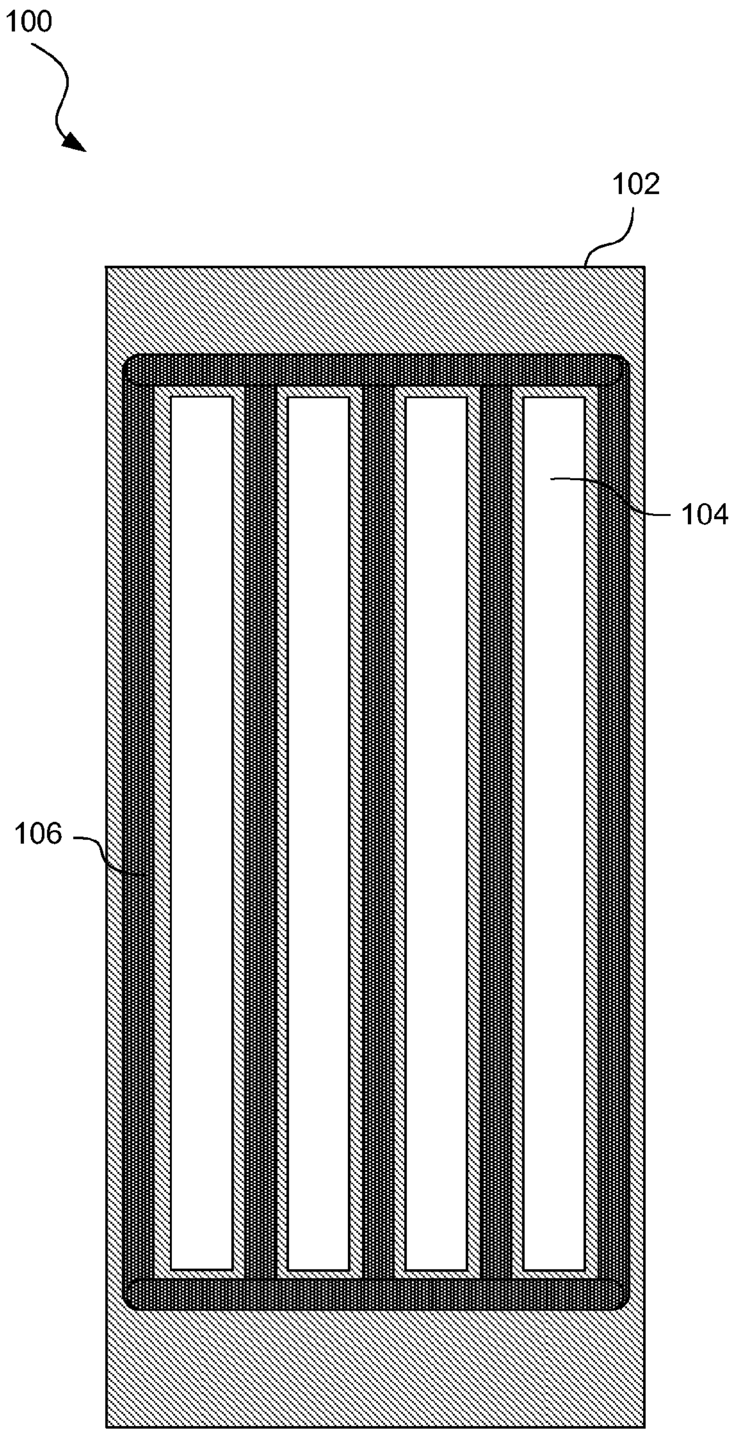
FIG. 1 is a diagram showing an illustrative top view of a substrate on which adhesive lines may be placed, according to one example of principles described herein.

As noted above, many devices are made up of small components that are connected or held in place using some form of adhesive. Specially designed equipment is often needed to apply small amounts of precisely placed adhesive to such parts.

One example of such equipment for placing adhesive is jet dispensing equipment. Jet dispensing is a method by which very small and controlled quantities of a fluid, such as an adhesive, are selectively ejected from a nozzle and thus dispensed where needed. Jet dispensing can be used for adhesives and other viscous fluids.

Typically, a tank holding the adhesive is put under pressure. When a nozzle connected to the tank is opened, the pressure in the tank will project the adhesive out of the nozzle until the nozzle is closed. By leaving the nozzle open for a particular period of time while moving the nozzle along a substrate, a solid line of adhesive can be formed. By continually opening and closing the nozzle while moving the nozzle in relation to the substrate, a number of closely placed beads will form a line of adhesive.

In some instances, lack of a uniform thickness in a line of jet dispensed adhesive can be problematic. Such lack of uniformity can result in too much or too little adhesive being used to connect or hold together small components.

These issues are especially acute when the device being assembled is one in which fluid will be flowing between components joined by the adhesive. For example, too much adhesive may expand into the fluid flow path, e.g., slots in the components joined by adhesive, and obstruct the free flow of the fluid.

Issues also arise because the components being joined are often not completely flat or smooth. Thus, the proper amount of adhesive placed between one set of components being joined might be too much or too little adhesive for placement between another set of components with different surface variations. Furthermore, the proper amount of adhesive placed between one set of components being joined in one location might be too much or too little adhesive for another location between the same two components due to surface variations.

In light of these and other issues, the present specification discloses methods and systems for placing adhesive in a manner that effectively connects two components, particularly components that are joined to create a fluid flow path. According to certain illustrative examples, the adhesive placed onto a substrate is placed such that it has a greater height to width ratio. This is done by placing adhesive in stacked lines, meaning that a second line of adhesive is formed or "stacked" on top of a previously deposited line of adhesive.

A jet dispensing process, as will be described in more detail below, can be used with this stacking technique to significantly increase the line height without significantly increasing the line width. By using adhesive lines with higher height to width ratios, the two substrates being connected may be placed further apart. This allows more room for variations or differences in the surface height of each substrate.

Stacking adhesive lines can also limit the expansion of adhesive into the slots in the member that are to form a fluid flow path. As noted above, such expansion of adhesive into the slots might obstruct the intended flow of fluid.

Through use of methods and systems embodying principles described herein, various components making up various devices may be connected together efficiently. Specifically, where fluid flows through components connected by adhesive, connections may be made that do not obstruct the flow of fluid within the components. Furthermore, because a lower degree of precision can be tolerated in the surface height of the components being joined, the components can be manufactured at a lower tolerance and a corresponding lower cost.

Throughout this specification and in the appended claims, the term "line," referring to a line of adhesive, may be either a solid line of adhesive or a line of closely placed adhesive beads or spaced adhesive deposits of any shape.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described is included in at least that one example, but not necessarily in other examples. The various instances of the phrase "in one example" or similar phrases in various places in the specification are not necessarily all referring to the same example.

FIG. 1 is a diagram showing an illustrative top view (100) of a substrate (102) on which adhesive lines (106) may be placed. The substrate (102) represents a generic component that is to be joined to another component by adhesive. Many components so joined may have a relatively flat surface where the adhesive is placed to form the interface with the other component being connected. As used herein, the term "substrate" may refer alternatively to a substrate or a relatively flat surface of a shaped component where an interface with a second component is to be made.

According to certain illustrative examples, the substrate (102) includes a number of slots (104). In the example illustrated in FIG. 1, these slots (104) are used to form a fluid flow path.

In the illustrated example, the substrate (102) includes four slots (104). Such a substrate (102) may be used as part of a printhead. Each slot (104) may be used as a main ink flow line. A typical printing system includes four colors of ink. Thus, the substrate (102) here includes one slot (104) for a fluid flow path for each different color of ink the printhead will handle.

The adhesive lines (106) are placed adjacent to the slots (104) in a manner that entirely surrounds the slots (104). This is so that when the substrate (102) is connected to a second substrate with similar slots, each slot will be sealed off. This may be relevant, for example, if fluid, such as ink, will be flowing through the slots (104).

If the slots were not completely sealed off at the junction between the two substrates, fluid flowing through one slot might leak into other slots. This can be problematic if different colors of ink flow through the different slots.

One method of placing the adhesive lines onto the substrate is to use jet dispensing. As mentioned above, jet dispensing is often used for applications that involve the connection of very small parts. This is because jet dispensing provides for the placement of a viscous fluid such as an adhesive into carefully and precisely placed lines.

One method of jet dispensing adhesive is to eject small beads of adhesive from an adhesive nozzle onto a substrate. This is done by regularly opening and closing a nozzle connected to an adhesive tank under pressure. The adhesive nozzle moves across the substrate such that subsequently placed beads are placed close to one another. In some instances, the beads are placed so close that they join together to form an unbroken line of adhesive. Thus, the line of adhesive may be a broken line of separate adhesive depositions, an unbroken and uniform line of adhesive or an unbroken line that varies along its length due to the rapid opening and closing of the jet dispenser valve and a consequently varying quantity of adhesive being deposited as the line is formed.

Figure 2:
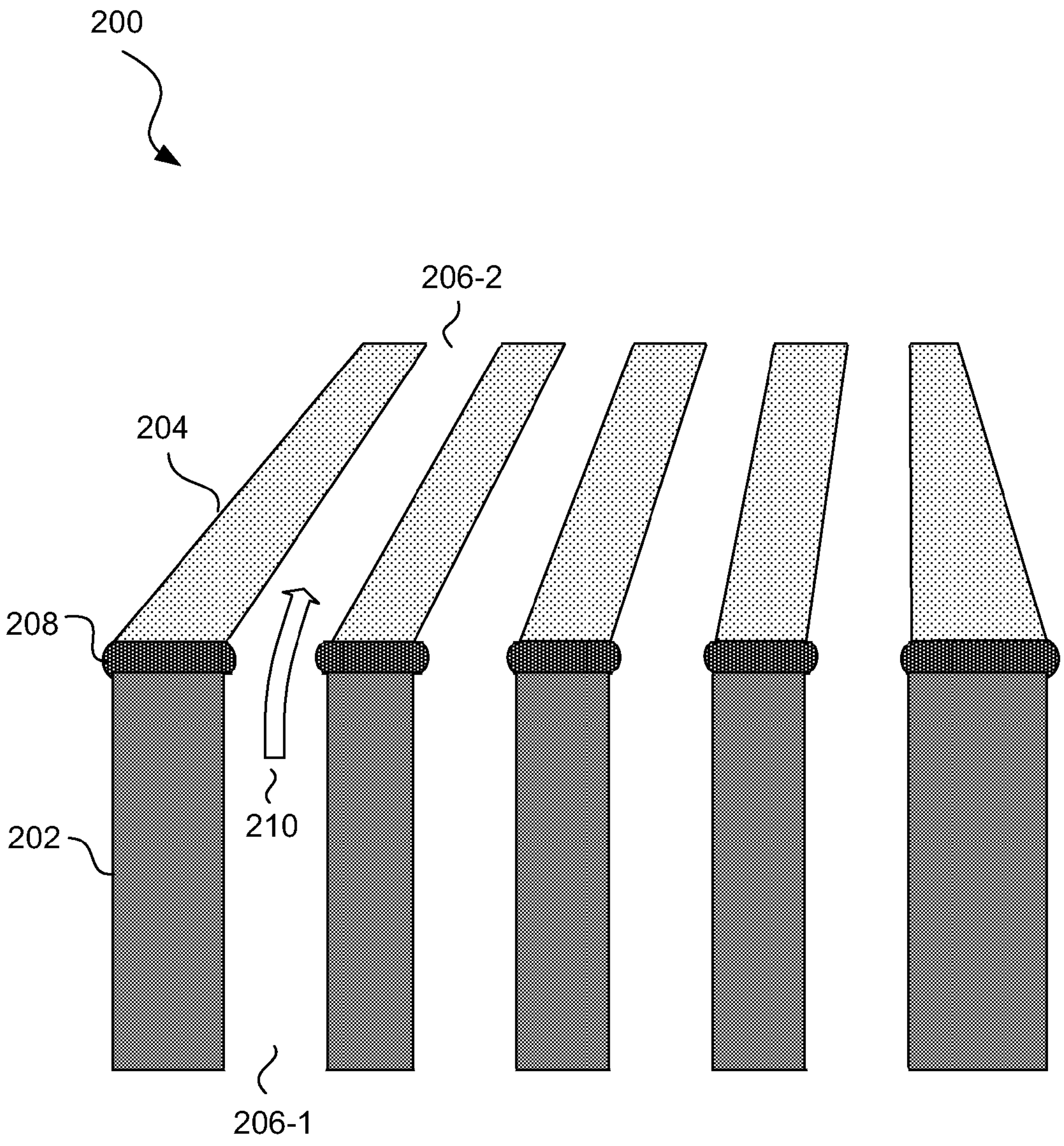
FIG. 2 is a diagram showing an illustrative cross sectional view of adhesive lines placed between two substrates, according to one example of principles described herein.

FIG. 2 is a diagram showing an illustrative cross sectional view (200) of adhesive lines (208) placed between two substrates (202, 204). According to certain illustrative examples, a first substrate (202) is connected to a second substrate (204) such that the slots (206-1) in the first substrate (202) are aligned with the slots (206-2) in the second substrate. Because the adhesive is placed around the slots in order to seal off each slot, fluids may then flow (210) through the slots (206-1) in the first substrate (202) into the slots (206-2) of the second substrate (204) or vice versa.

If the adhesive (208) extends too far into the slots (206-1, 206-2), then the flow of fluid through those slots will be adversely affected. As will be described in more detail below, the parts of the substrate between the slots are not always completely flat or completely smooth. Thus, there may be some places between the two connecting substrates where the surfaces will be farther apart or closer together.

This may be addressed by increasing the volume of adhesive in the lines. However, simply increasing the volume of the adhesive lines that are dispensed between the slots will cause both an increase in the height and the width of the adhesive lines. The increase in width will thus lead to expansion of the adhesive into the slots which will obstruct the flow of fluids flowing through those slots. As noted above, in some examples, the fluid flowing through the slots may be a marking fluid such as ink.

In one example, the first substrate is made of a plastic material. Additionally, the second substrate is made of a silicon material. The silicon material can be used to form ink nozzles. The semiconductor properties of silicon also allow circuitry to be built into the substrate which can be used to selectively eject ink from the ink nozzles formed into the silicon substrate. The slots (206-2) shown in FIG. 2 can act as ink flow lines. The ink flow lines supply ink to the small ink chambers associated with each ink nozzle. Thus, when an ink nozzle fires a droplet of ink and empties its associating ink chamber, the ink chamber may be refilled with ink from the main ink flow line. Ink is typically ejected using thermal and piezoelectric mechanisms. These mechanisms are different than the jet dispensing of adhesive described herein.

Figure 3A:
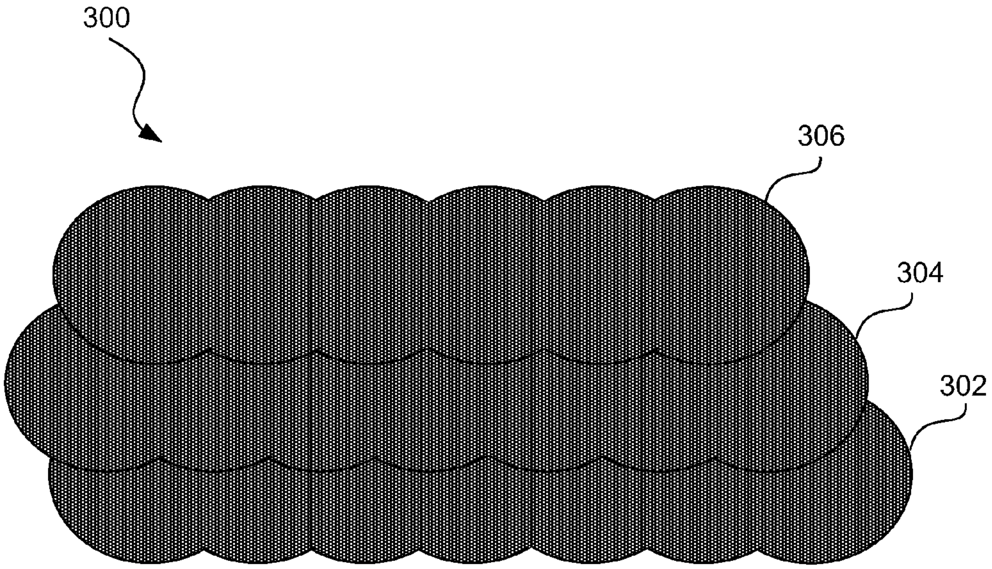
FIG. 3A is a schematic diagram showing an illustrative side view of a stacked adhesive line, according to one example of principles described herein.

FIG. 3A is a schematic diagram showing an illustrative side view of a stacked adhesive line (300). By keeping the volume of the adhesive lines being jet dispensed onto a substrate and stacking multiple lines on top of each other, an adhesive line with a higher height to width ratio may be realized. For example, jet dispensing equipment may place a first line (302) of adhesive onto a substrate. A second line (304) of adhesive may then be placed on top of the first line (302). Additionally, a third line (306) of adhesive may be placed on top of the second line to form a triple stack of adhesive lines. Any number of adhesive layers may be employed as best suits a particular application.

Figure 3B:
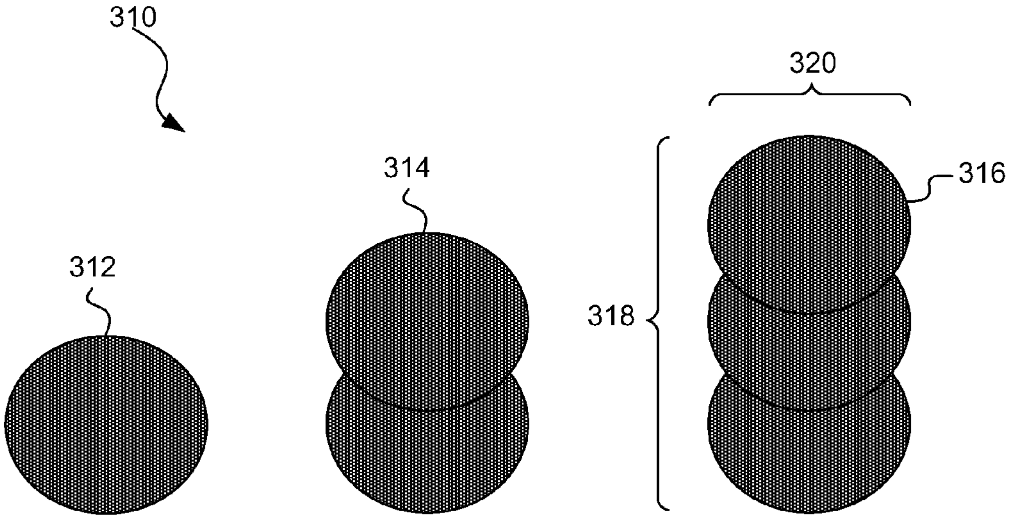
FIG. 3B is a schematic diagram showing an illustrative front view of adhesive lines, according to one example of principles described herein.

FIG. 3B is a diagram showing a schematic front view (310) of adhesive lines. FIG. 3B illustrates the front view of a single stacked line of adhesive (312), a double stacked line of adhesive (314), and a triple stacked (316) line of adhesive. As the number of adhesive lines stacked on top of each other increases, the height (318) to width (320) ratio also increases, while the line width remains relatively unchanged. These stacked adhesives lines are able to provide a better connection between two substrates.

The physical properties of the adhesive can be designed such that the lower stacks of adhesive lines will support the higher stacks. In general, adhesives with a higher viscosity will be able to support more stacks of adhesives. Various other properties of the adhesive may be adjusted as well so that the adhesive effectively connects the materials forming both substrates (202, 204).

In one example, the width of a single stack (312) may be approximately 450 micrometers (μm) with a height of 280 μm. This leads to a height to width ratio of 0.6 to 1. The width of a double stack (314) may be 470 μm with a height of 570 μm. This leads to a height to width ratio of 1.2 to 1. The width of a triple stack (316) may be 490 μm with a height of 770 μm. This leads to a height to width ratio of 1.6 to 1. Thus, as the height increases, the width does increase by a small amount. However, this amount is insignificant compared to the amount by which the height increases. Therefore, stacking the lines leads to a higher height to width ratio.

Figure 4A:
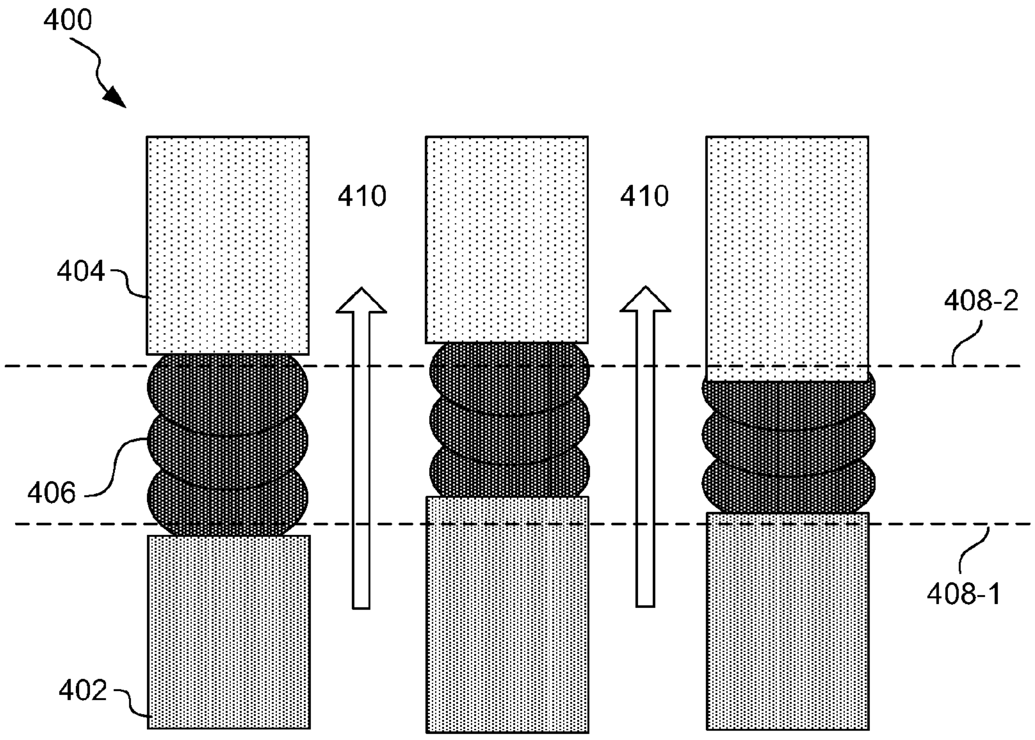
FIG. 4A is a schematic diagram showing an illustrative cross sectional view of two substrates being connected with stacked adhesive lines, according to one example of principles described herein.

FIG. 4A is a schematic diagram showing a cross sectional view of two substrates (402, 404) being connected with stacked adhesive lines (406). As mentioned above, the surface of the portions of the substrate between slots (410) is generally not even with a surface plane. This is because it is difficult to manufacture small components with such precision. FIG. 4A illustrates how the portions of the substrates (402, 404) between slots (410) are not always level. This is due to the irregularities in both the surface plane (408-1) of the first substrate (402) and the surface plane (408-2) of the second substrate. The surface plane (408) can be defined as the average surface level of all portions of a substrate.

With the use of stacked adhesive lines (406) having a higher height to width ratio than un-stacked lines, the adhesive is better able to handle the variation in the surfaces of the substrate without pushing too much adhesive out into the slots and block the flow of fluid flowing therein. The variation in distance between the two substrates (402, 404) may still cause the stacked adhesive lines (406) to expand by different amounts. However, the high height to width ratio makes it so the adhesive lines (406) do not expand so far so as to block the flow of any fluid flowing through the slots (410).

Figure 4B:
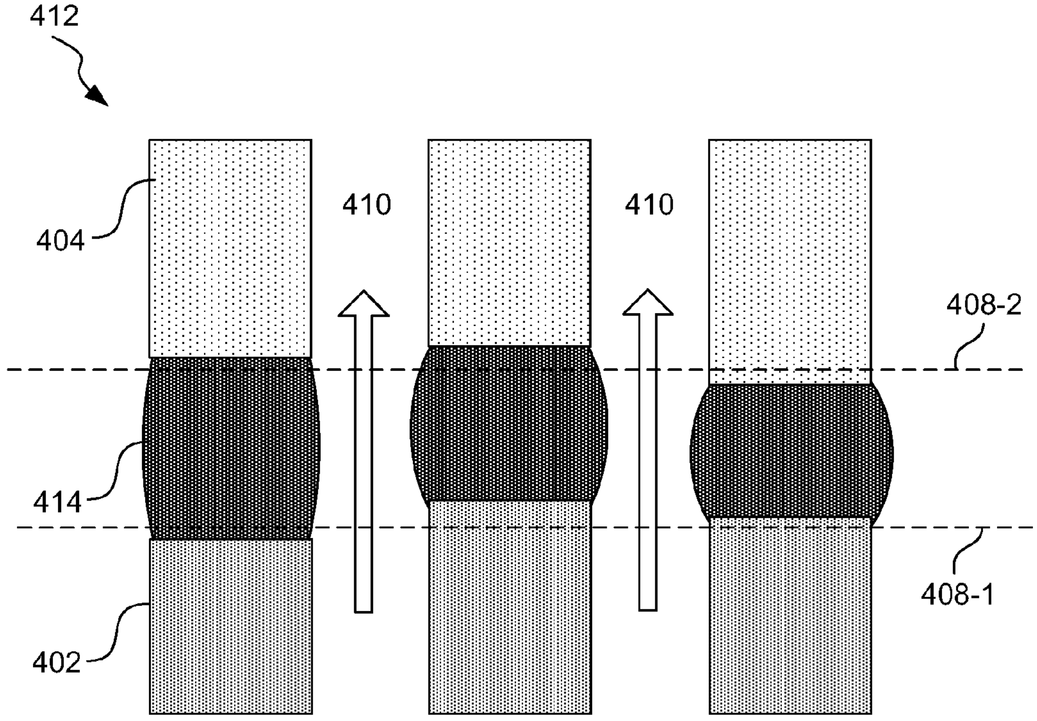
FIG. 4B is a schematic diagram showing an illustrative cross-sectional view of two substrates connected using larger volume adhesive lines, according to one example of principles described herein.

FIG. 4B is a schematic diagram showing an illustrative cross-sectional view (412) of two substrates (402, 404) connected using larger volume adhesive lines (414). As mentioned above, simply increasing the volume of the adhesive lines being dispensed onto the substrate can lead to expansion of the adhesive into the slots (410). This obstructs the flow of fluids flowing through the slots (410) between the two substrates (402, 404). The expansion of the adhesive is more likely to occur at locations where the distance between the two substrates (402, 404) is greater. Thus, the use of stacked adhesive lines (406) as illustrated in FIG. 4A provides a better connection between two substrates.

Figure 5:
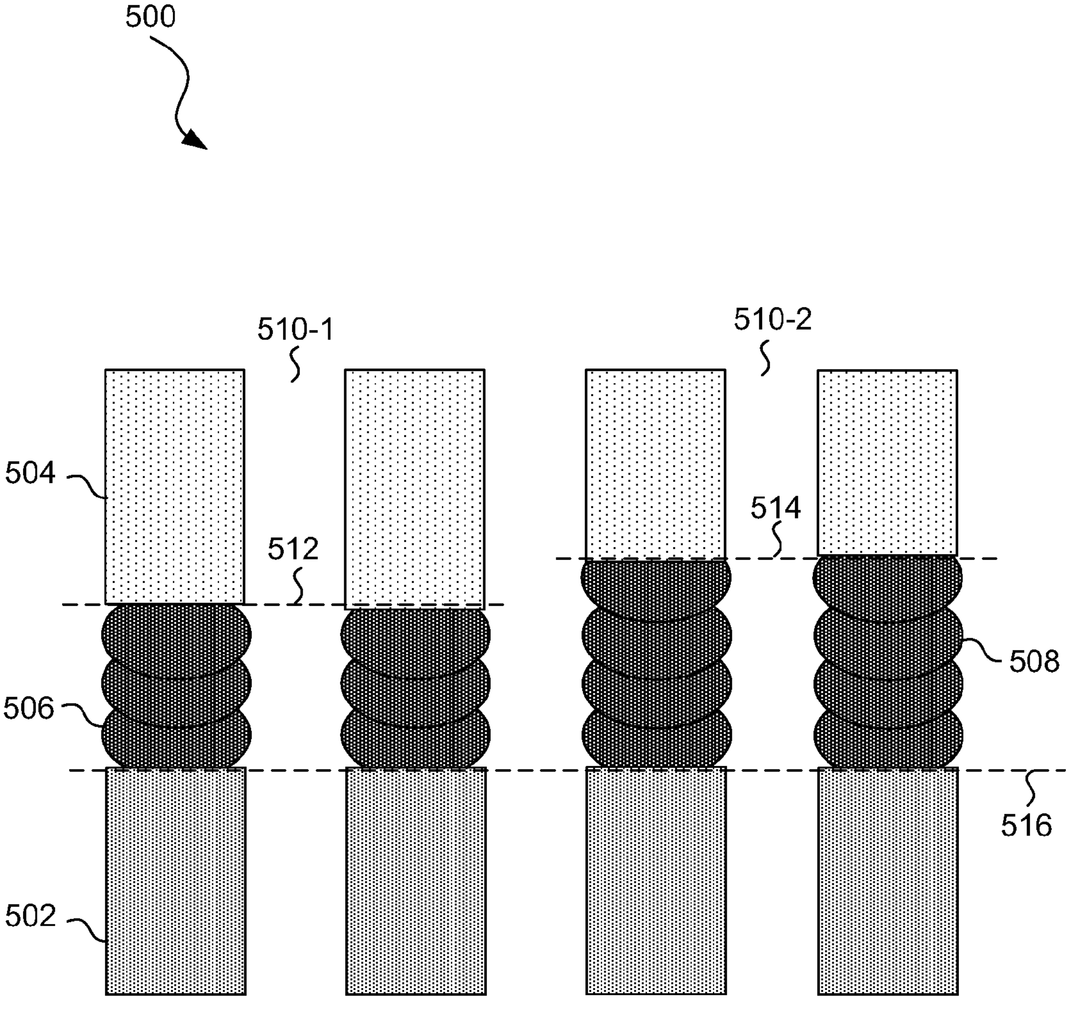
FIG. 5 is a schematic diagram showing an illustrative cross-sectional view of two substrates connected together with adhesive lines having a varying number of stacked adhesive lines, according to one example of principles described herein.

FIG. 5 is a schematic diagram showing an illustrative cross-sectional view of two substrates (502, 504) connected together with adhesive lines having a varying number of stacks. According to certain illustrative examples, the number of stacked adhesive lines used to connect two substrates (502, 504) may vary. For example, it may be the case that at least one of the substrates has at least two different surface plane levels (512, 514). Thus, it may be useful to use a different number of adhesive line stacks at particular regions of the substrate.

In the example illustrated in FIG. 5, the first substrate (502) has only one surface plane level (516). The second substrate (504), however, includes at least two different surface plane levels (512, 514). The surface plane (512) near slot 1 (510-1) is slightly lower than the surface plane near slot 2 (510-2). Where the region of the second substrate near slot 1 is closer to the first substrate (502), a triple adhesive stack (506) may be used. Where the region of the second substrate (504) near slot 2 (502-2) is farther away from the first substrate (502), a quadruple stack of adhesives may be used. In this case, the jet dispensing equipment may place the first three lines of adhesive at all portions of the substrate where adhesive lines are to be placed. Then, the jet dispensing equipment may selectively place the fourth stack at the appropriate locations where there is a difference in the surface plane levels.

The variation in surface plane levels may be intentional to meet particular design goals. For example, it may be the case that a particular region of a substrate may be manufactured slightly differently than other regions in order to meet various design purposes. The result of this difference may lead to a difference in surface level that is approximately the height of one or more adhesive stacks. In some cases, the variation in both the first substrate (502) and the second substrate (504) may be such that at least one additional adhesive stack will be appropriate.

In some cases, the irregularity in a single surface plane level may be great enough that there are regions throughout the surface of the substrate where a different numbers of stacked adhesive lines would be appropriate. A scanning mechanism may be used to scan the surface of a substrate before it is connected to another substrate. The information obtained from that scan can be used to determine where more or fewer adhesive line stacks may be used. Thus, some adhesive lines may include more stacks than others. In some cases, a single adhesive line may be a triple stack throughout most of the length. However, there may be portions along that triple stacked adhesive line where a fourth adhesive line is placed in order to match the region of the substrate that will be placed at those portions.

Figure 6:
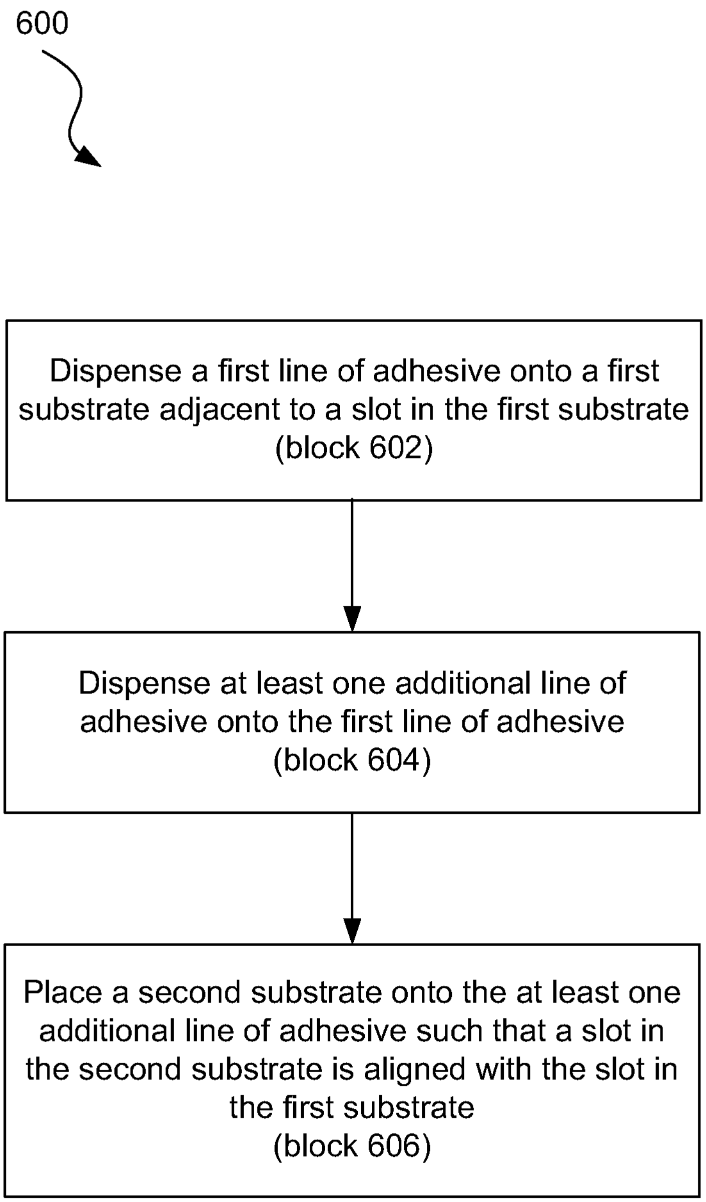
FIG. 6 is a flowchart showing an illustrative method for connecting substrates using stacked adhesive lines, according to one example of principles described herein.

FIG. 6 is a flowchart showing an illustrative method for adhesive stacking. According to certain illustrative examples, the method includes dispensing (block 602) a first line of adhesive onto a first substrate adjacent to a slot in the first substrate. This first line of adhesive may completely surround the slot by running adjacent to all edges of the slot. The first substrate may include multiple slots, each slot having a complete line of adhesive placed around all edges of that slot.

The method (600) continues by dispensing (block 604) at least one additional line of adhesive onto the first line of adhesive. Thus, each line of adhesive around each slot may have a second line of adhesive stacked on top of that line. This will form a double stack of adhesive for at least one particular line. In some cases, additional lines may be stacked to create triple or quadruple stacked lines of adhesive. The number of adhesive lines stacked on top of each other may depend on the nature of the substrates being joined together. For example, some substrate components may have more variation along the surface plane and thus a higher height to width ratio may be more desirable.

The method (600) continues by placing (block 606) a second substrate onto the at least one additional line of adhesive such that a slot in the second substrate is aligned with the slot in the first substrate. After the two substrates are positioned correctly, the adhesive can be allowed to solidify. This will securely hold the substrates together and create a complete seal so that fluid flowing through the slots of both substrates will not leak out. The high height to width ratio of the stacked adhesive lines allows for variation in the surface plane without pressing the adhesive too far into the slots. If the adhesive gets pressed into the slots it will solidify there and inhibit the proper flow of fluid through that slot.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for adhesive stacking, the method comprising:

dispensing a first line of adhesive onto a first substrate;

dispensing at least one additional line of adhesive stacked onto said first line of adhesive, in which a second line of adhesive is selectively placed along one or more predetermined portions of said first line but on less than all of said first line; and placing a second substrate onto said at least one additional line of adhesive to join said first and second substrates;

in which said lines of adhesive are dispensed using jet dispensing such that said at least one additional line of adhesive comprises a height and a width that is substantially equal to the height and width of the first line of adhesive.

2. The method of claim 1, wherein:
said lines of adhesive are dispensed around a slot in said first substrate; and
said second substrate is placed such that a slot in said second substrate is aligned with said slot in said first substrate to form a fluid flow path through said slots that is sealed by said lines of adhesive.

3. The method of claim 2, in which said first substrate and said second substrate form part of a print head.

4. The method of claim 1, in which said lines of adhesive comprise one of: lines of adhesive beads and unbroken lines.

5. The method of claim 1, in which said one or more predetermined portions corresponds to a region of variation in a surface plane level of at least one of: said first substrate and said second substrate.

6. The method of claim 1, in which said first substrate comprises a plastic material and said second substrate comprises a semiconductor material.

7. The method of claim 1, further comprising dispensing a third line of adhesive that is stacked on said first line of adhesive and said at least one additional line of adhesive.

8. The method of claim 1, in which:
said first line of adhesive comprises a height to width ratio of less than one; and
said stacked lines of adhesive together comprises a height to width ratio greater than one.

9. A device comprising:
a first substrate comprising a number of slots; and
a second substrate comprising a number of slots,
said second substrate connected to said first substrate with adhesive formed in stacked lines adjacent to said slots such that said slots from said first substrate are aligned with said slots from said second substrate, in which the stacked lines comprise a first line and a second line, wherein said second line of adhesive is selectively placed along one or more predetermined portions of said first line but on less than all of said first line;
in which said first and second lines of adhesive are dispensed using jet dispensing such that said second line of adhesive comprises a height and a width that is substantially equal to the height and width of the first line of adhesive.

10. The device of claim 9, in which said stacked lines of adhesive comprise one of: lines of adhesive beads and unbroken lines of adhesive.

11. The device of claim 9, in which said second line of adhesive is selectively placed along at least one predetermined portion of said first line and is not coextensive with said first line, said predetermined portion corresponding to a region of variation in a surface plane level of at least one of: said first substrate and said second substrate.

12. A printhead comprising:
a first substrate comprising a number of slots;
a first line of adhesive disposed onto said first substrate adjacent to said slots;
at least one additional line of adhesive disposed onto said first line of adhesive, in which said second line of adhesive is selectively placed along one or more predetermined portions of said first line but on less than all of said first line; and
a second substrate disposed onto said at least one additional line of adhesive such that a number of slots in said second substrate are aligned with said number of slots in said first substrate;
in which said first and second lines of adhesive are dispensed using jet dispensing such that said second line of adhesive comprises a height and a width that is substantially equal to the height and width of the first line of adhesive.

13. The printhead of claim 12, in which said first and second substrates each comprise four slots that are aligned and sealed with stacked lines of adhesive to form fluid flow paths for four differently colored inks within said printhead.

14. A device made by the method of claim 1, said device comprising:
said first substrate comprising a number of slots; and
said second substrate comprising a number of slots,
said second substrate connected to said first substrate with said adhesive formed in stacked lines being adjacent to said slots such that said slots from said first substrate are aligned with said slots from said second substrate.

15. The device of claim 14, in which said stacked lines of adhesive comprise one of: lines of adhesive beads and unbroken lines of adhesive.

16. The device of claim 14, in which said first and second substrates each comprise slots that are aligned and sealed with stacked lines of adhesive to form fluid flow paths for differently colored inks within a printhead comprising said substrates and stacked lines of adhesive.

17. The method of claim 1, further comprising scanning a surface of said first substrate to determine said one or more predetermined portions where more or fewer additional lines of adhesive will be dispensed.

18. The method of claim 1, wherein:
dispensing said first line of adhesive onto a substrate comprises dispensing a high viscosity adhesive onto the first substrate; and
dispensing said at least one additional line of adhesive onto said first line of adhesive comprises dispensing a lower viscosity adhesive on said high viscosity adhesive.

19. A method for bonding a first substrate to a second substrate comprising:
scanning a surface of a first substrate to determine at least one predetermined portion where additional lines of adhesive will be dispensed;
dispensing a first line of high viscosity adhesive onto a first substrate;
dispensing at least one additional line of lower viscosity adhesive stacked onto said first line, in which an additional line of lower viscosity adhesive is selectively placed along said at least one predetermined portion of said first line and is not coextensive with said first line, said predetermined portion corresponding to a region of variation in a surface plane level of said first substrate; and
placing a second substrate onto said at least one additional line of lower viscosity adhesive to join said first substrate and said second substrate.

* * * * *